United States Patent
Friedrich

(10) Patent No.: US 7,102,488 B2
(45) Date of Patent: Sep. 5, 2006

(54) METHOD FOR SELECTING TRANSPONDERS

(75) Inventor: Ulrich Friedrich, Ellhofen (DE)

(73) Assignee: ATMEL Germany GmbH, Heilbronn (DE)

( * ) Notice: Subject to any disclaimer, the term of this patent is extended or adjusted under 35 U.S.C. 154(b) by 257 days.

(21) Appl. No.: 10/503,257

(22) PCT Filed: Jan. 15, 2003

(86) PCT No.: PCT/EP03/00324

§ 371 (c)(1), (2), (4) Date: Jul. 29, 2004

(87) PCT Pub. No.: WO03/065285

PCT Pub. Date: Aug. 7, 2003

(65) Prior Publication Data

US 2005/0128130 A1 Jun. 16, 2005

(30) Foreign Application Priority Data

Feb. 1, 2002 (DE) ................... 102 04 346

(51) Int. Cl. *H04Q 5/22* (2006.01)
(52) U.S. Cl. ............ 340/10.2; 340/10.1; 340/10.31
(58) Field of Classification Search ........... 340/10.2, 340/10.1, 10.3, 10.4, 10.5, 5.26, 7.46; 370/329
See application file for complete search history.

(56) References Cited

U.S. PATENT DOCUMENTS

| | | | |
|---|---|---|---|
| 5,489,908 A | 2/1996 | Orthmann et al. | |
| 5,594,429 A | 1/1997 | Nakahara | |
| 5,811,885 A | 9/1998 | Griessbach | |
| 5,856,788 A | 1/1999 | Walter et al. | |
| 5,929,780 A | 7/1999 | Pagnol et al. | |
| 6,265,962 B1 | 7/2001 | Black et al. | |
| 6,307,848 B1 * | 10/2001 | Wood, Jr. | 370/329 |
| 6,456,191 B1 | 9/2002 | Federman | |
| 6,774,766 B1 * | 8/2004 | Moyer | 340/10.32 |
| 6,963,270 B1 * | 11/2005 | Gallagher et al. | 340/10.2 |
| 7,009,526 B1 * | 3/2006 | Hughes et al. | 340/825.49 |
| 2001/0014090 A1 | 8/2001 | Wood, Jr. | |
| 2002/0188750 A1 | 12/2002 | Li | |
| 2003/0061063 A1 | 3/2003 | Vacherand et al. | |
| 2005/0024186 A1 | 2/2005 | Friedrich | |
| 2005/0083178 A1 | 4/2005 | Friedrich | |

FOREIGN PATENT DOCUMENTS

DE 44 38 276 5/1995

(Continued)

OTHER PUBLICATIONS

Automatic Identification—Radio Frequency Identification for Item Management, Part 6: Mode 6—Physical Layer, Anti Collision System and Protocols for Ultra High Frequency (UHF) Systems; Working Draft ISO/IEC WD 18000-6 Mode 3; Feb. 1, 2002; pp. 1 to 125.

*Primary Examiner*—Brian Zimmerman
*Assistant Examiner*—Nam Nguyen
(74) *Attorney, Agent, or Firm*—W. F. Fasse; W. G. Fasse

(57) ABSTRACT

In a method of selecting one or more transponders, the time duration of a reference interval is transmitted by the base station to the transponders in the header section of an information packet, each transponder compares the respective time durations of the reference interval and of a first time interval, and the further selection of the transponder depends on the result of the comparison.

2 Claims, 1 Drawing Sheet

FOREIGN PATENT DOCUMENTS

| | | |
|---|---|---|
| DE | 44 11 435 | 10/1995 |
| DE | 101 61 302 | 7/2003 |
| EP | 06 87 119 | 12/1995 |
| FR | 2805637 | 8/2001 |
| GB | 2 283 600 | 5/1995 |
| GB | 2340692 | 2/2000 |
| WO | WO 99/08396 | 2/1999 |

* cited by examiner

METHOD FOR SELECTING TRANSPONDERS

FIELD OF THE INVENTION

The present invention relates to a method for the selection of transponders according to the preamble of the patent claim 1.

BACKGROUND INFORMATION

Such a method is known from the publication U.S. Pat. No. 5,856,788. In this context, the transponders that are located in the HF field of a base station are identified by means of a selection method that operates in a so-called half-duplex operation. Thereby it is disadvantageous, that much time is required due to the half-duplex method. A further disadvantage of the method existed in that the time duration for the transmission of the control signals further increases especially if only a small HF bandwidth is available for the transmission of the control signals.

SUMMARY OF THE INVENTION

It is the object of the present invention to set forth a method for the selection of transponders, that can be carried out with a small time expenditure and that can be realized with few control signals.

This object is achieved according to the invention in a method of the above initially mentioned type further developed according to the invention.

Accordingly, the essence of the invention consists in that, in a first step a base station transmits to the transponders a reference length, which is then used to determine test bits in a following selection method. The selection method operates bit-wise, so that for each bit a selection is made whether a certain group or an individual transponder is selected or whether it shall fall back into a standstill or standby or silent mode. If a group or an individual transponder is selected, the transponder or transponders transmits an information signal. The base station receives these informations and qualitatively acknowledges these in that it transmits back an information that is then used in the transponder for the formation of a test bit. If the test bit corresponds with the transmitted information, then the transponder or the group of the transponders is further continued to be selected. If the test bit does not correspond with the transmitted information, the transponder or transponders fall back into a standby mode.

For this purpose, the selection of one or more transponders among a plurality of transponders by a base station is carried out by means of an electromagnetic wave, whereby an information packet (IP) is modulated onto the electromagnetic wave and the information packet (IP) comprises a header section (KO) and a data section (DA). Furthermore the data section (DA) contains a data word with a sequence of bits, whereby one bit is allocated to the bit sequence respectively in a time interval generated from two successive clock pulses. Moreover, an identification code embodied as a bit sequence is allocated to each transponder.

Furthermore, the transponders are woken up or activated by the base station by means of an application or reporting or log-on process, whereby as a result of the log-on process, a pointer in the transponders points to a first defined bit of the bit sequence of the identification code.

Moreover, in a first step, the time duration of a reference interval is transmitted in the header section of an information packet emitted or transmitted from the base station. In a second step, the time duration of the reference interval is stored in each transponder, and in a third step at the beginning of the data section each transponder transmits the significance or value of the defined bit of the identification code in a first time interval. In a fourth step, at the end of the first time interval, a comparison between time duration of the reference interval and the time duration of the first time interval is carried out in each transponder, and in a fifth step a value is allocated to a test bit from the result of the comparison. In a sixth step the transponders compare the value of the test bit with the value of the first bit transmitted in the first time interval, and the transponders in which the value of the first bit of the bit sequence of the identification code differs from the value of the test bit, are switched to a standby mode until the beginning of a further log-on process. Further, the transponders in which the value of the first defined bit of the bit sequence of the identification code corresponds with the value of the test bit transmit the value of the following bit of the bit sequence of their identification code in a second time interval.

In a further developed embodiment of the method, for the selection of further or for the selection of exactly one transponder, further or all the bits of the bit sequence of the identification code are compared, in that steps 4 to 6 are run through multiple times. In this context, after each run-through, the number of the time interval and the number of the bit position of the identification code is increased or reduced by one.

It is an advantage of the method, in comparison to the previous methods, that no reply or response signal needs to be transmitted from the base station to the transponders after each query or interrogation signal. In each run-through, the selection is carried out through the comparison of the test bit with one bit of the identification code. Even in a complete selection procedure for the identification of all transponders it is sufficient to transmit the reference length for the comparison only once in one header section of one information packet. The selection of the values is determined by the base station through the length of the time interval by means of the electromagnetic wave transmitted by it, in that the base station reduces or increases the time duration between two successive clock pulses relative to the reference length. In this context, one bit of the identification code of the transponder is transmitted to the base station in connection with each time interval prescribed by the base station. Thus, the selection method (method for anti-collision) operates in the so-called full-duplex operation.

Hereby the number of the symbols for the control of the selection method is considerably reduced. Hereby the time for the selection of groups or individual transponders is considerably reduced. Furthermore, the method can be carried out with various different modulation methods, such as for example, a phase and/or an amplitude modulation.

BRIEF DESCRIPTION OF THE DRAWINGS

The inventive methods shall be explained in the following in connection with the example embodiments in relation to a schematic drawing. It is shown by FIG. 1a an information packet, and FIG. 1b a hierarchical arbitration of eight transponders, and FIG. 2a a selection of the first of a total of two transponders, and FIG. 2b a selection of the second of a total of two transponders.

DETAILED DESCRIPTION OF AN EXAMPLE EMBODIMENT OF THE INVENTION

Figure 1A:
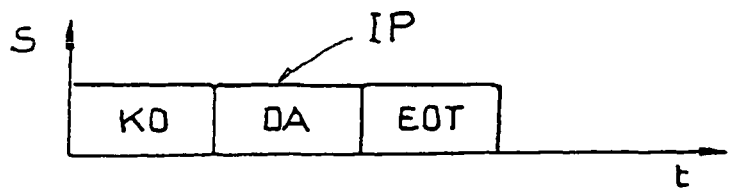

An information packet IP, consisting of a header section KO, a data section or region DA and an EOT section or region, is illustrated in FIG. 1a. Data are transmitted between one or more transponders and a base station by means of such an information packet IP. The number of the symbols and their characteristic identification are defined in the header section KO of the information packet, whereby the data to be transmitted are encoded in the data section or region with the characteristic identifications of the data symbol or symbols. Furthermore, the header section KO can be used for providing or transferring characteristic values or parameters which, for example, control the evaluation of the data word. Furthermore, with the EOT section or region, the receiver is informed of the end of the information packet by a prescribed characteristic identification.

Before a data exchange is carried out between a base station and one or more transponders, identification codes of all transponders that are located in the field of the base station must be transferred to the base station through an identification or selection of the transponders. This method is also referred to as anti-collision and is preferably carried out strictly hierarchically.

Figure 1B:
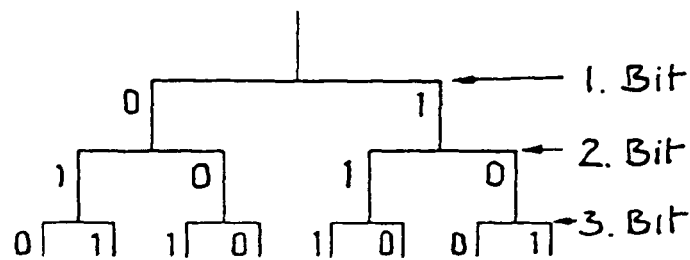

An identification code for a maximum of eight transponders is illustrated in the FIG. 1b. In order to communicate to or activate one of the eight transponders, a total of three bit planes or levels must be run through.

Figure 2A:
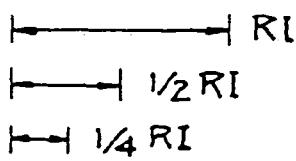
Figure 2B:
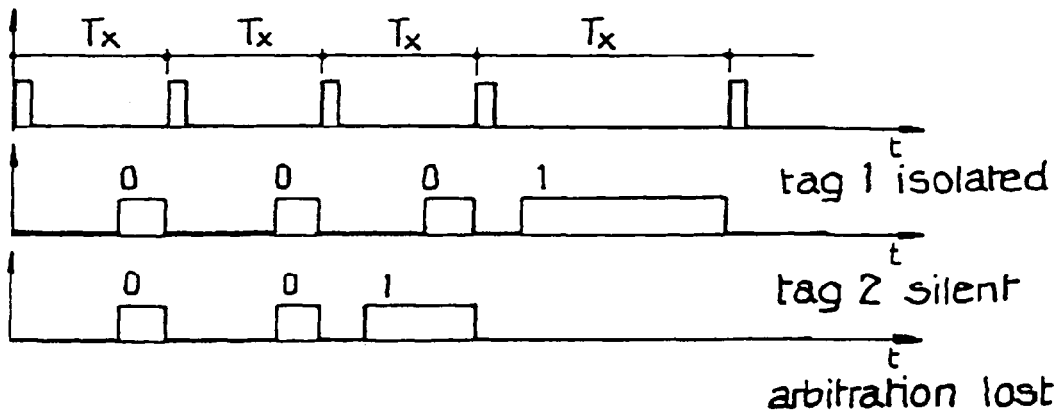
Figure 2B:
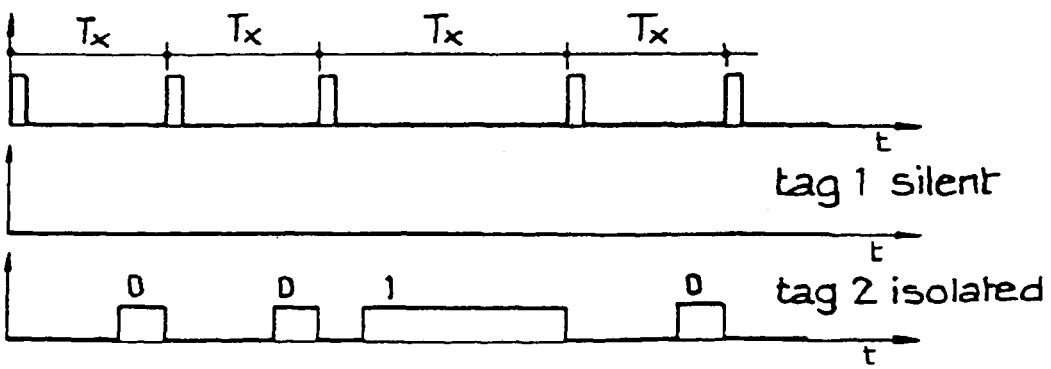

A selection of a first transponder in connection with a total of two transponders is illustrated in the FIG. 2a. After the transponders have notified the base station of their presence in a reporting or log-on process, the duration of the reference interval RI is notified or reported by the base station in the header section in a following information packet. Furthermore, in the header section, for the value of the data bit relative to the length of the reference interval RI, the two transponders are notified of the value ½ for the logical one and the value ¼ for the logical zero. In the data section following the header section, in the first time interval Tx, both transponders notify or report the value of the first bit position of their identification code. At the end of the first time interval Tx, both transponders compare the length of the time interval with the length of the reference interval RI.

The invention claimed is:

1. Method for the selection of one or more transponders from a plurality of transponders by a base station (BS) by means of an electromagnetic wave, whereby an information packet (IP) is modulated onto the electromagnetic wave, and the information packet (IP) comprises a header section (KO) and a data section (DA), and the data section (DA) contains a data word with a sequence of bits, whereby one bit is allocated to the bit sequence respectively in a time interval (TX) generated from two successive clock pulses, and an identification code embodied as a bit sequence is allocated to each transponder, and the transponders are woken up by the base station by means of a log-on process, and as a result of the log-on process, a pointer in the transponders points to a first bit of the bit sequence of the identification code, characterized in that in a first step, the time duration of a reference interval (RI) is transmitted in the header section (KO) of an information packet (IP) transmitted by the base station, in a second step, the time duration of the reference interval (RI) is stored in each transponder, in a third step, at the beginning of the data section (DA) in a first time interval (TX) each transponder transmits the value of the first bit of the identification code, in a fourth step, in each transponder at the end of the first time interval (TX) a comparison between time duration of the reference interval (RI) and the time duration of the first time interval (TX) is carried out, in a fifth step, a value is allocated to a test bit from the result of the comparison, in a sixth step, the transponders compare the value of the test bit with the value of the first bit transmitted in the first time interval (TX), and the transponders, in which the value of the first bit of the bit sequence of the identification code differs from the value of the test bit, are switched into a standby or silent mode until the beginning of a further log-on process, and the transponders, in which the value of the first bit of the bit sequence of the identification code corresponds with the value of the test bit, transmit the value of the second bit of the bit sequence of their identification code in a second time interval (TX).

2. Method according to claim 1, characterized in that further transponders or exactly one transponder are selected through a comparison of further or all bits of the bit sequence of the identification code, in that the steps 4 to 6 are run-through multiple times, and after each run-through the number of the time interval (TX) and the number of the bit position of the identification code are increased by one.

* * * * *